US009959672B2

United States Patent
Goel et al.

(10) Patent No.: US 9,959,672 B2
(45) Date of Patent: May 1, 2018

(54) COLOR-BASED DYNAMIC SUB-DIVISION TO GENERATE 3D MESH

(71) Applicant: ADOBE SYSTEMS INCORPORATED, San Jose, CA (US)

(72) Inventors: Naveen Prakash Goel, Noida (IN); Harsh Vardhan Chopra, New Delhi (IN); Amit Mittal, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days. days.

(21) Appl. No.: 14/948,827

(22) Filed: Nov. 23, 2015

(65) Prior Publication Data

US 2017/0148212 A1    May 25, 2017

(51) Int. Cl.
*G06T 17/20* (2006.01)
*G06T 15/04* (2011.01)

(52) U.S. Cl.
CPC ............ *G06T 17/205* (2013.01); *G06T 15/04* (2013.01)

(58) Field of Classification Search
None
See application file for complete search history.

(56) References Cited

U.S. PATENT DOCUMENTS

| 6,664,956 B1* | 12/2003 | Erdem | G06T 17/20 345/419 |
| 2005/0078124 A1* | 4/2005 | Liu | G06T 15/00 345/629 |
| 2009/0202150 A1* | 8/2009 | Fradkin | G06T 7/0083 382/173 |

* cited by examiner

*Primary Examiner* — Said Broome
(74) *Attorney, Agent, or Firm* — Shook, Hardy & Bacon L.L.P (57) ABSTRACT

Techniques for dynamically subdividing a 3D mesh to enhance texture and color reproduction are provided. In embodiments, a high-resolution image of an object is received, where the high-resolution image is mapped to a 3D mesh of the object. The high-resolution image has a higher resolution than the 3D mesh. Degrees of color variation in the high-resolution image are detected. Weights are calculated for areas of the 3D mesh based on the degrees of color variation in the high-resolution image. One or more of the areas of the 3D mesh is subdivided based on the calculated weights. Color values from the high-resolution image are then assigned to the 3D mesh.

20 Claims, 5 Drawing Sheets

COLOR-BASED DYNAMIC SUB-DIVISION TO GENERATE 3D MESH

BACKGROUND

A three-dimensional (3D) model can be used to represent an object in three dimensions on a computing device. Conventionally, a 3D model can be created using specialized software. This software is often expensive, and creating a 3D model from scratch using the software can be tedious and difficult. Thus, 3D (RGBD) scanning is often used to create 3D models from existing objects without the need for expensive software. 3D scanning uses RGB (color) information and separate D (depth) information to model the object. Typically, a 3D mesh of a scanned object is created for a 3D model using depth information. The 3D mesh defines the shape of the object. Color information for the 3D model can be represented by the vertex colors, i.e., the colors at the vertices in the 3D mesh. In this regard, the quality of the scanned object (texture and fidelity) depends on the density of the vertices in the 3D mesh.

Currently, most of the 3D scanners available in the market have much lower depth resolution relative to their color resolution. Therefore, color detail in 3D models scanned using these 3D scanners is usually very low. While color detail may not be as important for object with a few colors or little detail, object with fine details, such as jewelry, precious artifacts, replicas, parts of the human body, etc., may require a high level of color detail.

Many 3D scanners cannot accurately produce colors and textures of objects requiring a high level of detail. For example, color bleeding may occur for areas of the 3D model with a high degree of color variation due to not having enough vertices available to store the corresponding color information. One solution is to increase the number of vertices of the entire 3D model. However, this can result in very large files to store the 3D models. Another solution is to manually subdivide the vertices for specific regions of an object. For example, a user can view the 3D model in a 3D modeling application and manually subdivide areas of the 3D model to create additional vertices. However, manually subdividing vertices is very tedious and it is difficult to apply varying levels of subdivision to the object.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are concerned with generating a 3D mesh with varying densities of vertices to enhance texture and color reproduction in the 3D model. By having varying densities of vertices, areas with a high degree of color variation can be better represented. In some embodiments described herein, a high-resolution image and a 3D mesh of an object are received. Areas with a high degree of color variation in the high-resolution image are detected and weights are calculated for corresponding areas of the 3D mesh based on the degree of color variation. Based on the weights, the 3D mesh is further subdivided, creating additional vertices in the 3D mesh. Color is then assigned to the vertices of the 3D mesh based on the high-resolution image.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary. A "high-resolution image" is defined herein as an image of an object with a higher resolution or image detail than the 3D scan of the object. For example, if a 3D scanner may capture an object at a low resolution. An image with a higher resolution will contain additional detail information on the object, allowing for the information to be used to improve the quality of the 3D model.

A "3D mesh" is defined herein as a mesh representation of the object. Conventionally, a 3D model is a collection of vertices, edges, and faces that represent the shape of the object. Color values can also be assigned to the vertices, edges, and/or faces to identify the color for that portion of the 3D mesh. In this way, an object can be represented as a 3D model.

A "depth representation" is defined herein as the object data captured from the 3D scanner used to create the 3D model. For example, a 3D scanner can capture depth information for pixels of an object and translate that depth information into a 3D model.

Traditionally, 3D models created from RGBD scanners have difficulties in accurately producing colors and textures of objects requiring a high level of detail. For example, there may not be enough data for an area of the model to represent the object in great detail. In order for a 3D model to have a greater level of detail, more color and vertex information needs to be captured to create a more detailed representation of the object. However, a more detailed representation comes at a cost of greater storage requirements and computer processing power for the model. In order to minimize the storage requirements and computer processing power needed for the 3D model, it may be desirable to selectively increase the level of detail in areas of the object that require greater detail.

Embodiments of the present invention provide a mechanism to generate a 3D mesh with adaptive vertex resolution based on color variations in corresponding image data. For example, a high-resolution image of the object being modeled is used to determine color variations in the object. The high-resolution image is mapped to the 3D mesh of the object, and weights are calculated for the 3D mesh based on the color variations in the high-resolution image. Based on the weights, areas of the 3D mesh are subdivided (increasing the number of vertices) and colors from the high-resolution image are assigned to the vertices of the 3D mesh. Thus, areas of the 3D model with a high degree of color variation have more vertices to store corresponding color information, allowing for a more accurate and detailed 3D model of the object.

Figure 1:
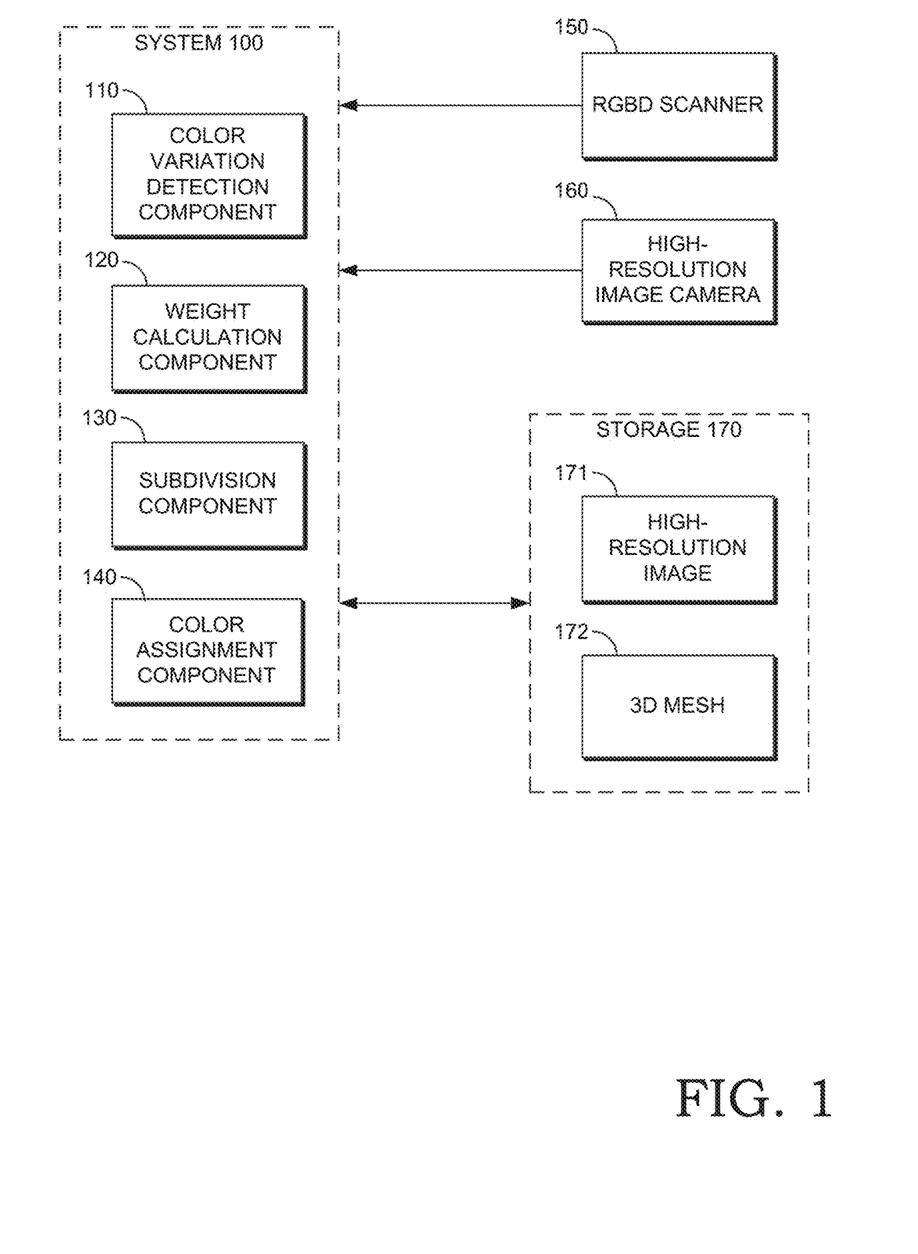
FIG. 1 is a block diagram illustrating an exemplary system for dynamically subdividing a 3D mesh to enhance texture and color reproduction in accordance with implementations of the present disclosure.

FIG. 1 is a block diagram illustrating an exemplary system for dynamically subdividing a 3D mesh to enhance texture and color reproduction in accordance with implementations of the present disclosure. A system for generating high color detail for a 3D mesh 100 includes a color variation detection component 110, weight calculation component 120, subdivision component 130, and color assignment component 140. The components of the system 100 can be located on one or more servers and/or one or more user devices, i.e., each of the components of the system 100 can be on a different server and/or user device. For example, the color variation detection component 110, weight calculation component 120, and subdivision component 130 can be on the same server, while the color assignment component 140 is on a different server. The system 100 can also be part of a cloud environment, e.g., web-based application.

The color variation detection component 110 receives a high-resolution image. In some embodiments, the high-resolution image is a 2D image. It should be understood that the high-resolution image need not be a 2D image and can be, e.g., a 3D image. The high-resolution image has more color information, e.g., a higher degree of color variation, and/or detail than the 3D mesh of the object. Thus, the high-resolution image can be used to add additional detail and/or color variation to the 3D model. The high resolution image can be from, e.g., a high-resolution image camera 160. In some embodiments, a high-resolution image 111 is stored in storage 110 and is used by the color variation detection component 110. The color variation detection component 110 detects areas of the high-resolution image with a high degree of color variation. In some embodiments, the color variation detection component 110 is an edge detection component. Using an edge detection component, areas with a high degree of color variation are determined to have a higher output value from the edge detection component. Although an edge detection component is described, other means of detecting color variations may also be employed.

The weight calculation component 120 calculates weights of the color variations in the high-resolution image. For example, if the color variation detection component 110 detected an area of the high-resolution image with a high degree of color variation, that area is given a higher weight than an area with a lower degree of color variation. In some embodiments, the weights are mapped to vertices of a 3D mesh captured by an RGBD scanner 150 or a 3D mesh 172 stored in storage 170. The 3D mesh is a depth representation using depth information, e.g., captured from the RGBD scanner 150. The 3D mesh corresponds to the high-resolution image, where pixels of the high resolution image are mapped to the vertices of the 3D mesh. Thus, each vertex of the 3D mesh is given a weight based on the degree of color variation in the high-resolution image. In some embodiments, the weights of the vertices are used to calculate weights for faces of the 3D mesh based on the high-resolution image. For example, if an edge detection component is employed, the weight calculation component calculates the weight for the faces of the 3D mesh based on the edges in the high-resolution image.

The subdivision component 130 subdivides the 3D mesh based on the weights of the 3D mesh calculated by the weight calculation component 120. Areas with higher weights are subdivided more than areas on lower weights. Thus, the degree of subdivision depends on the degree of color variation in the high-resolution image. This provides varying degrees of subdivision throughout the 3D mesh. In some embodiments, faces are determined for the 3D mesh. A "face" is a plane formed by three vertices of the 3D mesh. In some embodiments, a face is formed by more than three vertices. The subdivision component 130 assigns a degree of subdivision to each of the one or more faces based on the weight calculated for the one or more faces, the degree of subdivision being assigned based on a distribution, e.g., a sigmoid distribution. The subdivision component 130 recursively subdivides each of the one or more faces until a predetermined vertex count is achieved. The predetermined vertex count may be for the 3D mesh as a whole or for a portion of the 3D mesh.

The color assignment component 140 takes colors from the high-resolution image and maps the color to the 3D mesh. For example, colors from the high-resolution image are mapped to vertices of the 3D mesh. The color of a face of the 3D mesh is calculated from the colors of the vertices corresponding to the face. Since the colors of the high-definition image are mapped to the subdivided vertices of the 3D mesh, the colors and textures of the 3D mesh can be represented more accurately.

Having described various aspects of the system for generating high color detail for a 3D mesh 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location.

Various functions described herein as being performed by one or more entities may be carried out by hardware, firmware, and/or software. For instance, various functions may be carried out by a processor executing instructions stored in memory.

Figure 2:
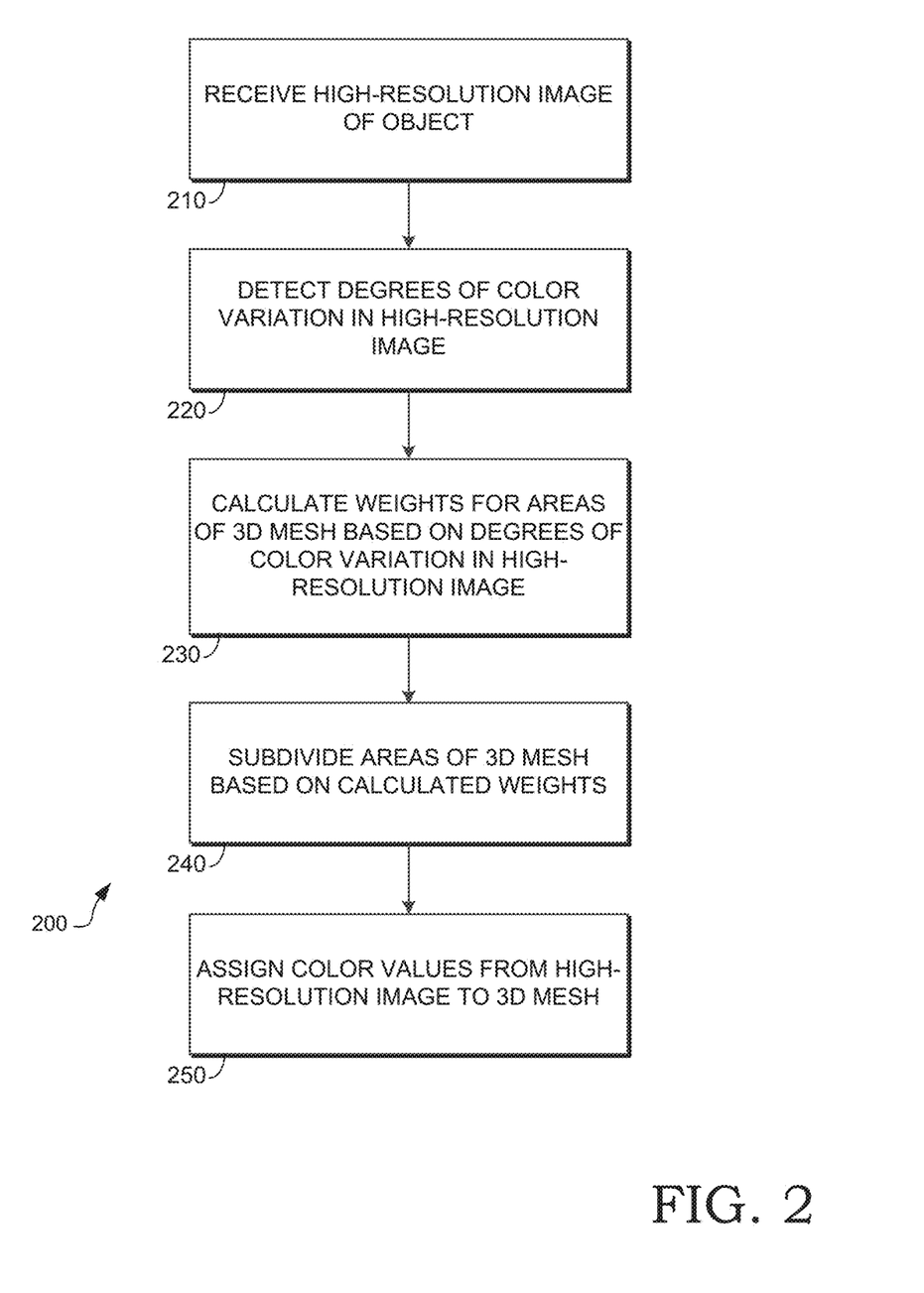
FIG. 2 is a flow diagram illustrating a method for dynamically subdividing a 3D mesh to enhance texture and color reproduction in accordance with implementations of the present disclosure.

Turning now to FIG. 2, a method 200 for dynamically subdividing a 3D mesh to enhance texture and color reproduction is shown, in accordance with implementations of the present disclosure. Method 200 may be performed on one or more servers in a data center or across multiple data centers. Method 200 may also be performed on one or more user devices At block 210, a high-resolution image of an object is received. Generally, a high-resolution image is an image with a higher resolution than the depth image used to create the 3D mesh. The high-resolution image can be an RGB image. The high-resolution image is mapped to a 3D mesh of the object. The 3D mesh can be created using an RGBD scanner, where a depth representation is created using the depth information. In some embodiments, more than one high-resolution image is received. The more than one high-resolution image is used to capture different areas of the 3D mesh. In some embodiments, the high-resolution image is stored with the 3D mesh. It should be understood, however, that the high-resolution image need not be stored and may be received and mapped to the 3D mesh before the degrees of color variation are detected.

At block 220, degrees of color variation are detected in the high-resolution image. In some embodiments, the degrees of color variation are detected using edge detection. The areas of the high-resolution with the strongest edge correspond to areas with the highest degree of color variation. In some embodiments, a grayscale image of the high-resolution image is obtained. The greyscale image is blurred by a Gaussian function and a Laplacian is applied to the blurred greyscale image to obtain a strength value for each pixel in the high-resolution image. It should be understood that the obtaining a greyscale image, applying a Gaussian blur, and applying a Laplace edge detection algorithm are described for illustrative purposes, and any other steps to obtain degrees of color variation of the high-resolution image can be used. Furthermore, one or more of the obtaining a greyscale image, applying a Gaussian blur, and applying a Laplace edge detection algorithm can be performed with other steps to obtain the degrees of color variation.

At block 230, weights for areas of the 3D mesh are calculated based on the degrees of color variation in the high-resolution image. In some embodiment, each vertex of the 3D mesh is assigned a weight. The weight is calculated from the degrees of color variation obtained in block 220. For example, if a Laplace edge detection algorithm is used, the values obtained from the Laplace edge detection algorithm are used to calculate the weight. In some embodiments, the weights are calculated from one or more pixel of the high-resolution image corresponding to a vertex of the 3D mesh. For example, the area around a vertex is used to calculate the weight of the vertex, with pixels closer to the vertex given more weight than pixels further from the vertex. In some embodiments, weights for the faces of the 3D mesh are calculated from the vertices corresponding to the face, where the vertices are further weighted based on the distance of the vertex to the barycenter of the face. For example, the 3D mesh can be a triangle mesh representation. A face of the 3D mesh is identified by three vertices of the 3D mesh corresponding to the face. In some embodiments, a weight is assigned to each vertex of the 3D mesh based on the strength values of pixels corresponding to the vertex, and a weight is calculated for each face of the 3D mesh based on the assigned weights of the vertices corresponding to the face and the distance of the vertices corresponding to the face from the face.

At block 240, areas of the 3D mesh are subdivided based on the calculated weights. In some embodiments, the weight assigned to an area of the 3D mesh in block 230 is used to determine a degree of subdivision of the area. For example, if weights of faces are calculated, the weights are used to determine a degree of subdivision of the face. One or more areas of the 3D mesh are subdivided based on the degree of subdivision. In some embodiments, faces are subdivided along a sigmoid distribution. For example, as a face is further subdivided, the degree of subdivision gets smaller and smaller. In some embodiments, a maximum level of subdivision for an area is determined, where the area at the maximum level of subdivision cannot be further subdivided. In other words, when the subdivision of one or more of the areas has reached a subdivision threshold, further subdivision of the one or more of the areas is prevented. In some embodiments, a barycenter subdivision algorithm is used to subdivide the 3D mesh.

At block 250, color values from the high-resolution image are assigned to the 3D mesh. Since the pixels of the high-resolution image are mapped to the 3D mesh, the colors of the pixels can be assigned to the vertices of the 3D mesh. In some embodiments, regions of the high-resolution image corresponding to areas of the 3D mesh are identified and color values of regions of the high-resolution image are interpolated to corresponding areas of the 3D mesh.

Figure 3:
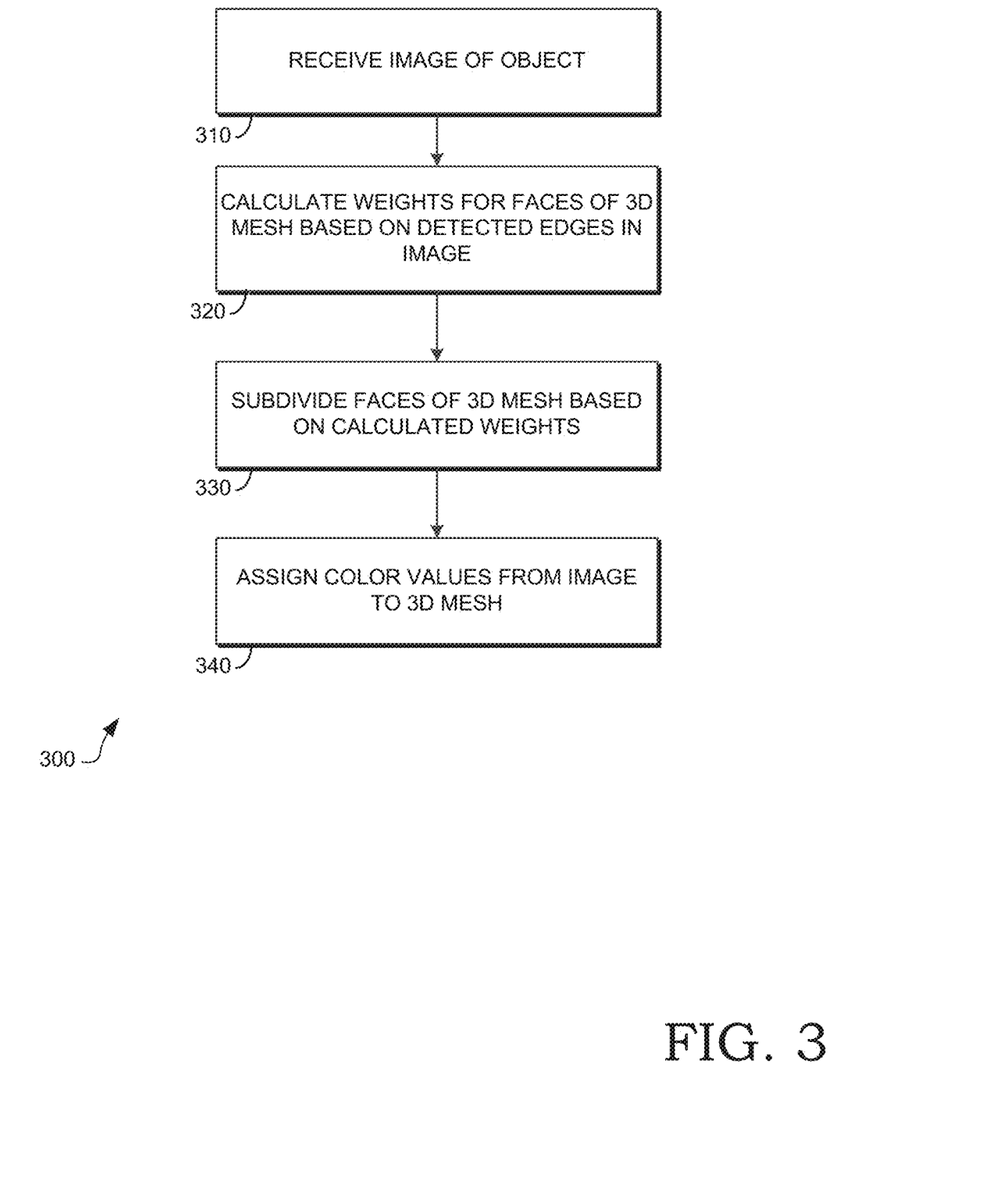
FIG. 3 is a flow diagram illustrating another method for dynamically subdividing a 3D mesh to enhance texture and color reproduction in accordance with implementations of the present disclosure.

Turning now to FIG. 3, another method 300 for dynamically subdividing a 3D mesh to enhance texture and color reproduction is shown, in accordance with implementations of the present disclosure. Method 300 may be performed on one or more servers in a data center or across multiple data centers. Method 300 may also be performed on one or more user devices.

At block 310, an image on an object is received. The image is mapped to a 3D mesh of the object and has a different resolution than the 3D mesh. In some embodiments, the 3D mesh is created from depth information to create a depth representation. The In some embodiments, the image has a higher resolution than the 3D mesh. In some embodiments, more than one image is received. In some embodiments, the image is stored with the 3D mesh.

At block 320, weights for faces of the 3D mesh are calculated based on edges in the high-resolution image. In some embodiments, a greyscale image of the image is obtained. A Gaussian blur is applied to the greyscale image to reduce noise of the image. An edge detection function is applied to the reduced-noise image. The results are values for the edges of the image indicating their relative strength. Values for the edges of image are calculated by the Laplace edge detection algorithm. Using the calculated values, values for corresponding vertices (i.e., vertices mapped to pixels of the image) are calculated. Thereafter, the values of the vertices corresponding to a face are used to calculate a weight for the face. In some embodiments, vertices of the 3D mesh are iteratively assigned weights based on the detected edges in the image corresponding to the vertices. Weights for the faces of the 3D mesh are calculated based on the assigned weights of the vertices corresponding to each of the faces.

At block 330, one or more faces of the 3D mesh are subdivided based on the calculated weights. In some embodiments, each face has an associated weight. The associated weight is used to determine a degree of subdivision for the face. For example, a face can be iteratively subdivided until a predetermined degree of subdivision is achieved. In some embodiments, the degrees of subdivision of the faces are mapped along a distribution, e.g., a sigmoid distribution.

At block 340, color values from the image are assigned to the 3D mesh. The values of the pixels of the image are interpolated to the vertices of the 3D mesh. Thereafter, the values of the vertices are used to calculate a color value for the corresponding face. In some embodiments, regions of the image are mapped to the faces of the 3D mesh. Color values of the regions of the image are interpolated to the faces of the 3D mesh.

Figure 4A:
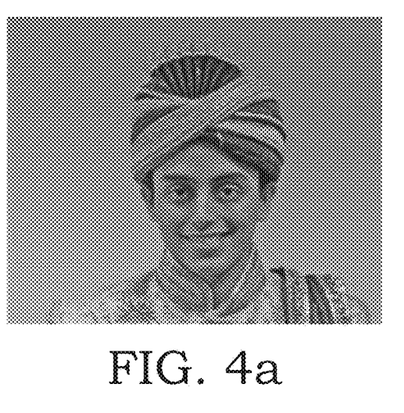
FIGS. 4a-d illustrate an example of dynamically subdividing a 3D mesh to enhance texture and color reproduction in accordance with implementations of the present disclosure.
Figure 4B:
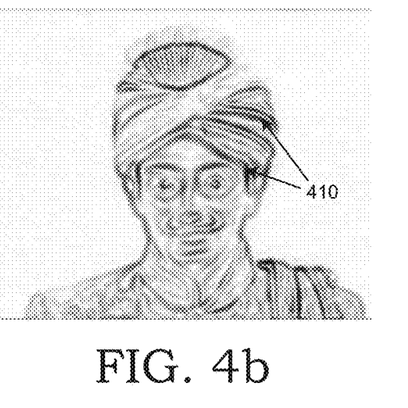
Figure 4C:
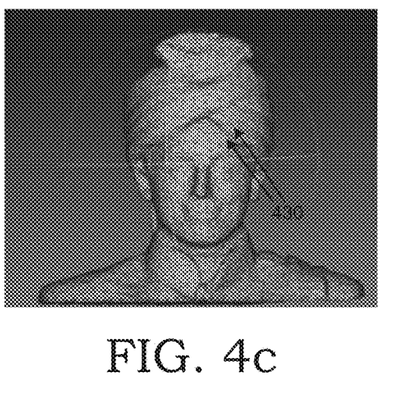
Figure 4D:
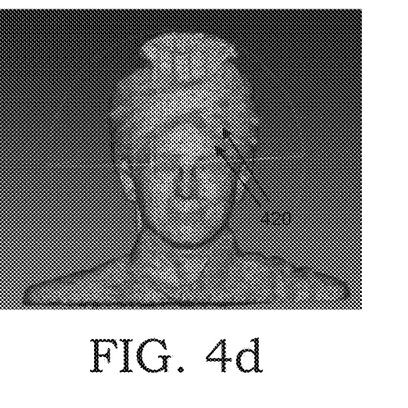

Turning now to FIGS. 4a-d, an example of dynamically subdividing a 3D mesh to enhance texture and color reproduction in accordance with implementations of the present disclosure is illustrated. FIG. 4a depicts a high-resolution image corresponding to a 3D mesh (shown in FIG. 4c). The high-resolution image is captured by a camera with a higher resolution than the scanner used to generate the 3D mesh of the object. FIG. 4b depicts the high-resolution image after an edge detection algorithm has been run on the high-resolution image. In FIG. 4b, a greyscale image of the high-resolution image is obtained and an edge detection algorithm is run on the greyscale image. As shown in FIG. 4b, areas with a high degree of color variation appear as darker lines 410. FIG. 4c depicts the 3D mesh that is generated from a 3D scanner. The 3D mesh is a depth representation using the depth information captured from the 3D scanner. The scanner has a lower resolution than the high-resolution image in FIG. 4a. This allows the high-resolution image to be used to determine areas of the 3D mesh to subdivide. FIG. 4d depicts the 3D mesh after subdivision is performed. For example, areas that have been subdivided 420 appear darker than their corresponding area 430 in FIG. 4c due to the increased number of vertices in those area.

These configurations provide for dynamically subdividing a 3D mesh to enhance texture and color reproduction by having varying degrees of subdivision on a 3D mesh of an object. By having varying degrees of subdivision, an object can be reproduced as a 3D model more accurately and with more detail, without requiring a large amount of storage space. For example, the 3D model will have sharper edges and finer detailing after dynamically subdividing the 3D mesh using the configurations described above.

Figure 5:
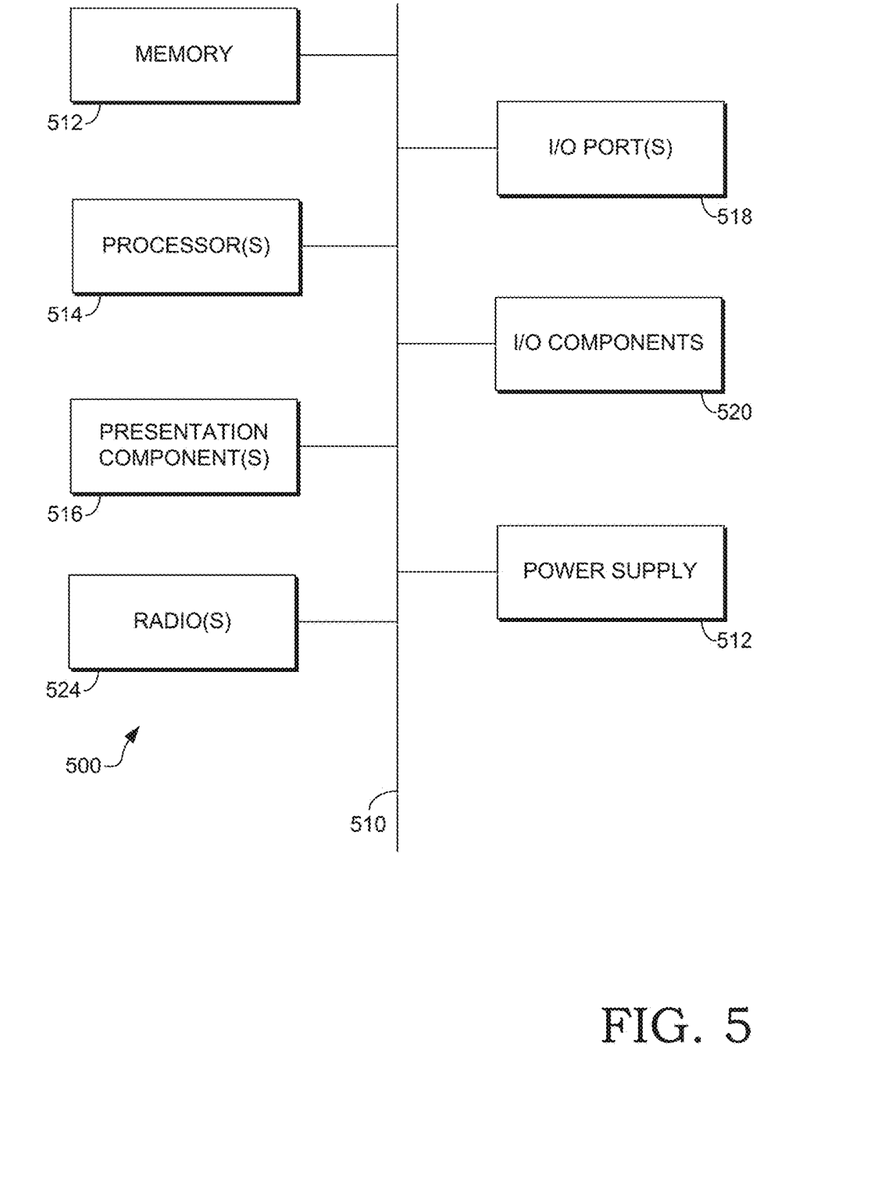
FIG. 5 is a block diagram illustrating an exemplary computing environment suitable for use in implementations of the present disclosure.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component 520. Also, processors have memory. The inventors hereof recognize that such is the nature of the art, and reiterate that the diagram of FIG. 5 is merely illustrative of an exemplary computing device that can be used in connection with one or more aspects of the invention. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio. The radio transmits and receives radio communications. The computing device may be a wireless terminal adapted to received communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

What is claimed is:

1. A method, performed by one or more computing devices, for dynamically subdividing a three-dimensional (3D) mesh, comprising:
   receiving a high-resolution image of an object, the high-resolution image being mapped to a 3D mesh of the object;
   detecting degrees of color variation in the high-resolution image;
   at a processor of the one or more computing devices, calculating weights for areas of the 3D mesh based on the degrees of color variation in the high-resolution image;
   subdividing one or more of the areas of the 3D mesh based on the calculated weights; and
   assigning color values from the high-resolution image to the 3D mesh.

2. The method of claim 1, wherein calculating the degrees of color variation comprises:
   obtaining a greyscale image of the high-resolution image;
   blurring the greyscale image by a Gaussian function; and
   applying a Laplacian to the blurred greyscale image to obtain a strength value for each pixel in the high-resolution image.

3. The method of claim 2, wherein the calculating weights for areas of the 3D mesh comprises:
   assigning a weight to each vertex of the 3D mesh based on the strength values of pixels corresponding to the vertex; and
   calculating a weight for each face of the 3D mesh based on the assigned weights of the vertices corresponding to the face and a distance of the vertices corresponding to the face from the face.

4. The method of claim 1, wherein the subdividing one or more of the areas of the 3D mesh comprises:
   determining a degree of subdivision based on the weights of the areas of the 3D mesh; and subdividing one or more of the areas based on the degree of subdivision.

5. The method of claim 4, wherein the subdividing one or more of the areas comprises:
when the subdivision of the one or more of the areas has reached a subdivision threshold, preventing further subdivision of the one or more of the areas.

6. The method of claim 1, wherein the assigning color values to the 3D mesh comprises:
identifying regions of the high-resolution image corresponding to areas of the 3D mesh; and
interpolating color values of regions of the high-resolution image to corresponding areas of the 3D mesh.

7. The method of claim 1, wherein the high-resolution image is an RGB image.

8. The method of claim 1, wherein the 3D mesh is a triangle mesh representation.

9. The method of claim 1, wherein the 3D mesh is generated from depth captured by a low-resolution scanner, a resolution of the 3D mesh being lower than a resolution of the high-resolution image.

10. A non-transitory computer-readable storage medium comprising instructions that cause a processor to perform a method for dynamically subdividing a three-dimensional (3D) mesh, the method comprising:
receiving an image of an object, the image being mapped to a 3D mesh of the object, the image having a different resolution than the 3D mesh;
calculating weights for faces of the 3D mesh based on detected edges in the image;
subdividing one or more of the faces of the 3D mesh based on the calculated weights, a degree of subdivision being mapped along a sigmoid distribution; and
assigning color values from the image to the 3D mesh.

11. The non-transitory computer-readable storage medium of claim 10, wherein the calculating weights for faces of the 3D mesh comprises:
reducing noise of the image; and
applying an edge detection function to the reduced-noise image.

12. The non-transitory computer-readable storage medium of claim 10, wherein the calculating weights for faces of the 3D mesh comprises:
iteratively assigning weights to vertices of the 3D mesh based on the detected edges in the image corresponding to the vertices of the 3D mesh; and
calculating weights for the faces of the 3D mesh based on the assigned weights of the vertices corresponding to each of the faces.

13. The non-transitory computer-readable storage medium of claim 10, wherein the assigning color values from the image to the 3D mesh comprises:
mapping regions of the image to the faces of the 3D mesh; and
interpolating color values of the regions of the image to the faces of the of the 3D mesh.

14. The non-transitory computer-readable storage medium of claim 10, wherein the image is an RGB image.

15. The non-transitory computer-readable storage medium of claim 10, wherein the 3D mesh is a triangle mesh representation.

16. The non-transitory computer-readable storage medium of claim 10, wherein the 3D mesh is generated from depth captured by a low-resolution scanner, a resolution of the 3D mesh being lower than a resolution of the image.

17. A system for dynamically subdividing a three-dimensional (3D) mesh of an object, comprising:
one or more processors; and
memory, the memory comprising instructions executed by the one or more processors, the memory configured to perform functionality for:
a color variation component configured to detect areas of a high-resolution image with a high degree of color variation, the high-resolution image being mapped to a 3D mesh of the object, the 3D mesh being a depth representation of the object, the detecting areas of the high-resolution image with the high degree of color variation comprising:
obtaining a greyscale image of the high-resolution image,
blurring the greyscale image, and
obtaining a strength value for each pixel in the greyscale image;
a weight calculation component configured to calculate weights for faces of the 3D mesh based on the areas of the high-resolution image with the high degree of color variation;
a subdivision component configured to subdivide one or more of the faces of the 3D mesh based on the calculated weights; and
a color assignment component configured to assign color values from the high-resolution image to the 3D mesh.

18. The system of claim 17, wherein blurring the greyscale image comprises blurring the greyscale image by a Gaussian function; and
obtaining the strength value for each pixel in the greyscale image comprises applying a Laplacian to the blurred greyscale image.

19. The system of claim 17, wherein the weight calculation component is further configured to:
assign a weight to each vertex of the 3D mesh based on strength values of pixels of the high-resolution image corresponding to the vertex, the strength values of the pixels being calculated from the areas of the high-resolution image with the high degree of color variation; and
calculate a weight for each face based on the assigned weights of the vertices corresponding to the face, the weight for each face being calculated based on a distance of each vertex corresponding to the face from a barycenter of the face.

20. The system of claim 17, wherein the subdivision component is further configured to:
assign a degree of subdivision to each of the one or more of the faces based on the weight calculated for the one or more of the faces, the degree of subdivision being assigned based on a distribution; and
recursively subdivide each of the one or more of the faces until a predetermined vertex count is achieved.

* * * * *